M. C. KRARUP.
SPRING REGULATOR.
APPLICATION FILED JAN. 25, 1917.
1,326,600.
Patented Dec. 30, 1919.
2 SHEETS—SHEET 2.
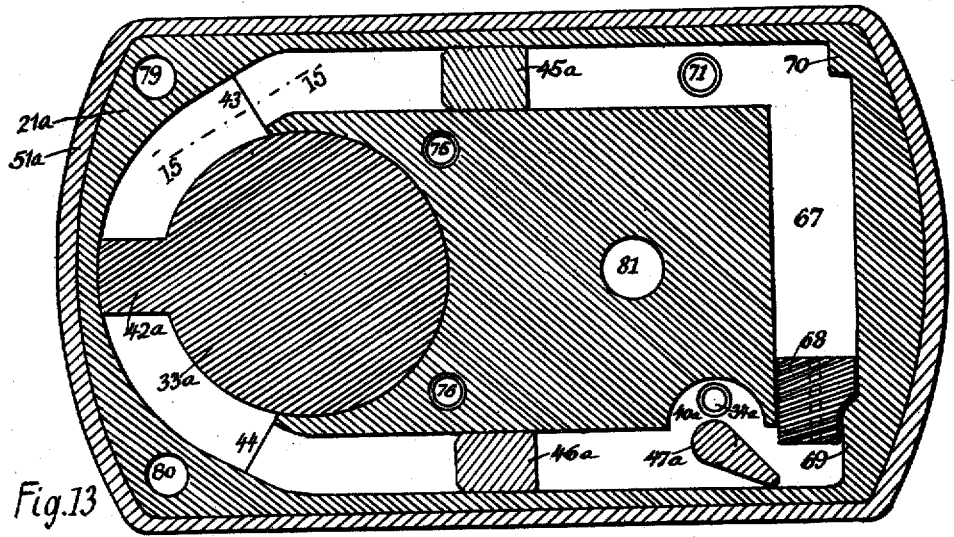
Fig. 13
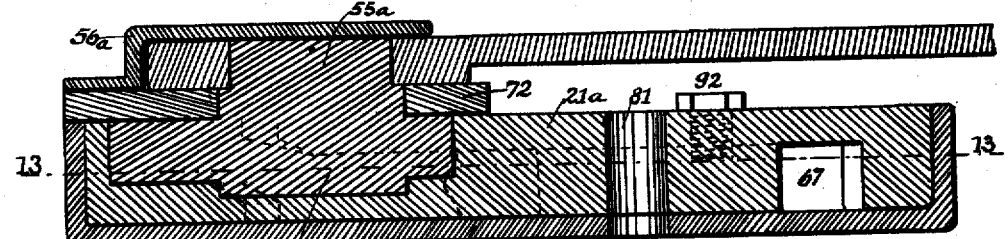
Fig. 14
Fig. 15
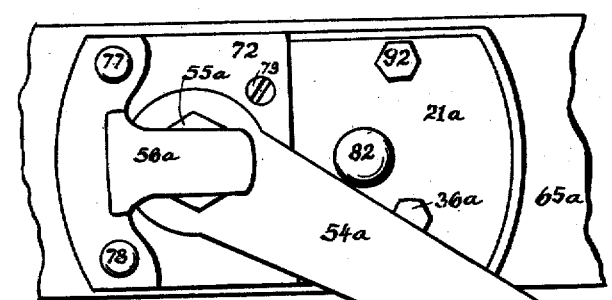
Fig. 16
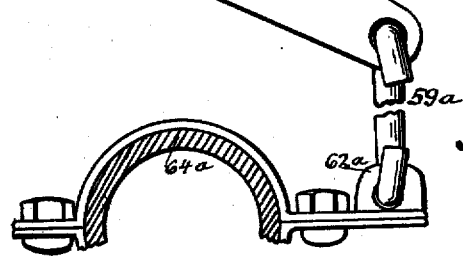
INVENTOR
Marius C. Krarup

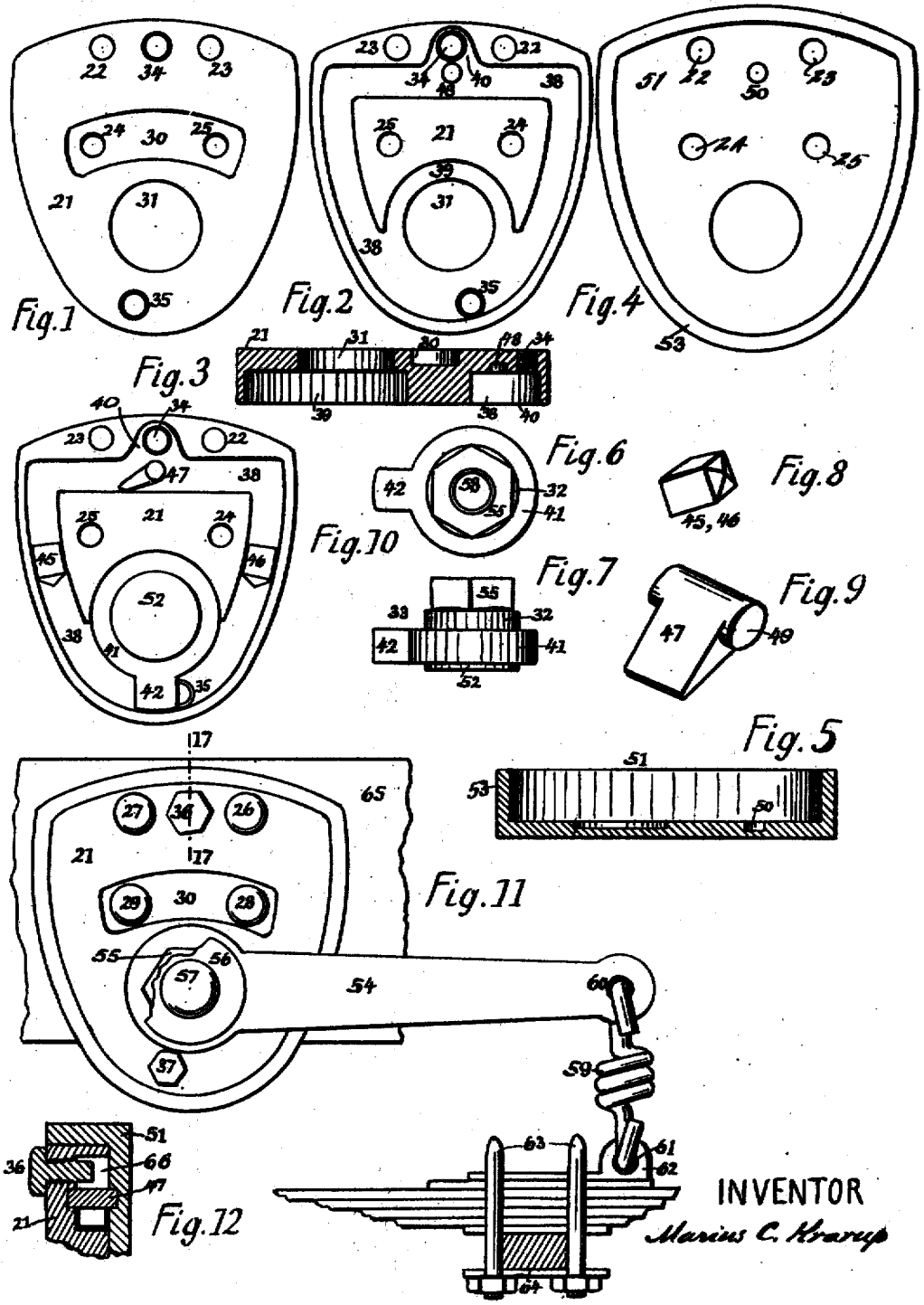

UNITED STATES PATENT OFFICE.

MARIUS C. KRARUP, OF NEW YORK, N. Y.

SPRING-REGULATOR.

1,326,600.

Specification of Letters Patent.

Patented Dec. 30, 1919.

Application filed January 25, 1917. Serial No. 144,452.

*To all whom it may concern:*

Be it known that I, MARIUS C. KRARUP, a citizen of the United States, and a resident of the borough of Manhattan, in the city, county, and State of New York, United States of America, have invented certain new and useful Improvements in Spring-Regulators, of which the following is a specification.

My invention relates to devices for obtaining desirable action from springs intended for easing shocks and sudden movements, especially vehicle springs, and its object is to provide an effective mechanism by means of which undesirable movements of parts connected by springs may be avoided. This and other objects of the invention will appear in the following specification in which I will describe my invention, the novel features of which I will set forth in appended claims.

Referring to the drawings, Figure 1 is a top view of plate 21 referred to hereinafter as the channel plate. Fig. 2 is a view of the same from the opposite side. Fig. 3 is a central lengthwise section of the same plate. Fig. 4 is a top view of a flanged base plate and Fig. 5 is a central lengthwise section of the same. Figs. 6 and 7 are respectively top view and side view of a piston member in the device. Fig. 8 is a perspective view of one of two similar floating pistons or separators 45 and 46. Fig. 9 is a perspective view of the member referred to hereinafter as the one-way valve. Fig. 10 is a view of the underside of the channel plate with the piston member, the auxiliary pistons and the one-way valve shown inserted in one of the relations which they may occupy in the operation of the device. Fig. 11 is a side view of the assembled device as mounted upon the side frame member of a motor vehicle and with its operating lever connected with one of the vehicle springs, a portion of a plate 56 being broken away to indicate more plainly the arrangement of the parts. Fig. 12 illustrates a detail in section. Fig. 13 is a view of a modified form of my invention mainly in section taken on the line 13—13 of Fig. 14, and Fig. 14 is a central lengthwise section of this form of my invention, with a portion of the operating lever broken away and certain relations of the parts indicated in dotted lines. Fig. 15 shows a detail taken in section on the line 15—15 of Fig. 13. Fig. 16 is a general side view on a smaller scale of this form of my invention as mounted upon a motor vehicle, some parts being broken away.

Like characters of reference designate corresponding parts in all the figures.

Channel plate 21 which may be of steel, or a metal or other material of sufficient strength, may be cast, forged, pressed or machined into the required shape. 22, 23, 24 and 25 are bolt holes through which, in the assembled device, are passed holding bolts 26, 27, 28 and 29, the heads of bolts 28 and 29 being recessed in the depression 30 formed on the top or exterior side of plate 21. The circular aperture 31 through which the hub 32 of piston member 33 is passed operates as one of the bearings for said piston member. The holes 34 and 35 are threaded to receive screw plugs 36 and 37. On the underside or interior side of 21 is formed the continuous channel 38 with the circular enlargement 39 and the smaller enlargement 40. The disk 41 of piston member 33 fits into 39 with the projecting lug 42 extending into the adjacent portion of channel 38 and capable of acting as a piston therein when the channel is covered and closed. The lateral portions of the channel may be formed with a curvature, as shown, or may be straight, the auxiliary pistons or separators 45, 46 being formed correspondingly, so as to fit in these portions of the channel. The spaces of the channel between piston 42 and the floating pistons 45 and 46 are normally filled with a plastic substance in such proportions as are indicated in Fig. 10 by the positions given 45 and 46 therein, and the remainder of the channel is normally, when the device is operated, filled with a fluid such as glycerin or oil. The plastic substance may be stiff or heavy grease mixed with graphite, or it may be soap, wax, tallow or any suitable compound not miscible or readily emulsified with the fluid selected for use.

Enlargement 40 of channel 38 may be omitted if the device is made in dimensions permitting screw plug 36 and one-way valve 47 to be large enough for strength without obstructing the channel more than is desirable. The recess 48 is so located that there is a passage for the fluid through enlargement 40 and another under the one-way valve 47, the latter being mounted pivotally with one end of its spindle 49 in recess 48 and the other end in the corresponding recess 50 formed in the flanged base plate 51. This plate or cup is normally pressed from sheet steel but may be cast or forged. A circular recess in 51 serves to receive a corresponding circular projection 52 on piston member 33 and form a bearing for it. The interior conformation and dimensions of flange 53 of the base plate corresponds closely to the exterior conformation and dimensions of channel plate 21. The latter, with the piston member 33, the plastic substance, the floating pistons 45 and 46 and the one-way valve 47 in their places, is pressed into base plate 51, a tight joint being formed between the edge of 21 and the interior of flange 53, while the interior bottom of 51 fits closely against the plane underside of channel plate 21. A gasket may be placed between these plane surfaces.

In assembling the device, the fluid above referred to is now introduced into the portion of channel 38 above the auxiliary pistons through the hole 34, and the latter is closed with screw plug 36. Hole 35 is closed with screw plug 37 whose interior end does not project into the channel. The operating lever 54 is mounted upon the hexagon projection 55 of piston member 33 and is secured in place by a plate 56 with a circular central aperture and a bolt 57 which is inserted through this aperture and screwed into a threaded hole 58 in the hexagon projection 55.

The link connecting the operating lever 54 to the vehicle axle, or in general to one of the two spring-connected parts whose movements it is the purpose to regulate, is preferably in the form of an extension-spring 59, which is substantially rigid in transmitting a thrust from the axle to operating lever 54 but possesses a definitely determined flexibility in transmitting a pull from the axle. One end of the wire forming this extension-spring link may be hooked into an eye 60 near the end of the operating lever, and the other end may be similarly hooked into an eye 61 in a lug 62, and this lug may then be secured under the vehicle spring clip 63 and thereby to the vehicle axle 64, whereafter the relations between the axle and the vehicle frame 65, being approximately constant laterally, prevent the link from coming loose. But the manner in which operating lever 54 or link 59 is secured forms no part of my invention, and any means may be employed by which relative movements between vehicle axle and vehicle frame or body are made to cause reciprocation of piston member 33.

The use of an extension-spring as a link between the operating lever and the vehicle represents, on the other hand, a novel combination of mechanical elements and one entailing distinct advantages. These relate in part to the facility with which the device may be adapted to many different vehicle conditions by varying the flexibility of the link, so that, for example, a link which is practically rigid in both directions of stress may be used for a heavy vehicle and one with a yield of several inches for a light vehicle, the device otherwise remaining the same. An important functional advantage will appear most clearly from the subsequent description of the operation of the device.

When a road shock is received and axle 64 is suddenly raised, link 59 is raised with it and causes operating lever 54 to be turned upward. Piston member 33 is thereby turned and drives the plastic substance and auxiliary piston 46 against the fluid in the upper portion of channel 38, and the fluid transmits the movement to floating piston 45, causing the plastic substance below the latter to follow piston member 33. In this movement due to compression of the vehicle spring the fluid meets with small resistance, as it raises the flap of the one-way valve and passes under it as well as over it with a total cross-sectional area for the flow at this point which is approximately equal to that at other points in the channel. Screw plug 36 may be adjusted, as represented in Fig. 12, so as to reduce the space 66 above the one-way valve to about one-half of what it would be without the screw plug projecting into it, or a screw plug of greater length may be used and may be adjusted so as to reduce the passage above the one-way valve still further, but even with such adjustment the free passage under the one-way valve assures a small total resistance to the movement of the fluid.

When the rebound of the vehicle spring begins, however, the flap of the one-way valve drops by gravitation and by pressure of the fluid, starting on its return movement, to the position shown in Fig. 10, and the fluid passage is thereby reduced about one-half. With adjustment of screw plug 36 as shown in Fig. 12 the passage is further reduced to about one-fourth, and a considerable resistance to rapid movement of the fluid is thereby produced, causing a retardation of the rebound of the vehicle spring.

This retardation should preferably be slight in case of slight shocks, which on average roads may follow one after another in quick succession and require a rapid return of the vehicle spring and the axle to their initial positions, and one-way valve 47 is therefore not instantaneous in action but of a nature admitting of a momentary and diminishing return flow of the fluid under it to take place while the valve is in the act of closing, so that the full retarding effect of the one-way valve action is not materialized until a slight rebound movement has been accomplished, such as a one-half inch movement of the vehicle axle.

As an unchecked rebound movement gains velocity in the measure as inertia is overcome, it is desirable, in the case of a severe shock, that the retardation effected by a spring regulator device shall be applied with a force increasing toward the moment when the velocity, if unchecked, would be greatest. This is accomplished by adjusting screw plug 36 to produce a retardation which in itself would be more pronounced than desirable and, in conjunction herewith, to employ the extension-spring link 59, which permits the vehicle axle to begin its rebound movement with a moderated resistance but causes this resistance to be gradually increased until the tension produced in the link is sufficient to overcome the resistance of the fluid at a certain rate of velocity. To have this rate of velocity one producing comfort and security is one of the objects of spring regulation, and is accomplished by my invention, since it is evident that, by adjustment of screw plug 36 and a suitable flexibility for link 59, rebound movements may be retarded progressively and in any degree that may be required for a given case.

To make clear the scope of my invention I will mention that it can be employed not only with a rigid link taking the place of extension-spring link 59, plug 36 in that case being adjusted to produce smaller resistance, but also without the auxiliary pistons and without having a plastic substance in one portion of the channel and a fluid in the other portion. The latter feature of my invention serves to obviate leakage without the use of tight packings, highly accurate workmanship and complicated construction, but it is clear that the functional advantages secured by my invention can be obtained in a measure or temporarily without this feature, by either employing a grease or soft plastic substance in the whole channel of the device and modifying the dimensions of the one-way valve and of the coördinated adjustable screw plug, or by using a fluid in the whole channel and employing suitable washers, packings and workmanship to prevent leakage; and I claim that such modifications, as well as one in which a rigid link is used instead of extension-spring 59, come under the scope of my invention.

In another modified form of my invention I combine it with the invention which constitutes the subject-matter of my United States Patent, No. 1,258,021 granted Mar. 5, 1918, in the manner shown in Figs. 13, 14, 15 and 16. The channel plate 21$^a$ has that portion of the channel which receives piston member 33$^a$, and in which the piston 42$^a$ is arranged to turn, formed on that side of the plate which becomes the exterior side in the mounted device, and the rest of the channel is formed on the other or interior side, facing the planed interior bottom of the flanged base plate 51$^a$, into which the channel plate is pressed. The two portions of the channel are obliquely connected at both sides of the piston member in the manner shown most clearly in Fig. 15, without appreciable contraction or enlargement of the cross-sectional area, so that the plastic substance passes through the ports of connection, 43, 44, without appreciable deformation or resistance when piston 42$^a$ is turned. Similarly as in the form of my invention first described, the plastic substance fills the channel between the auxiliary pistons or separators, 45$^a$ and 46$^a$, and piston 42$^a$, and thus the portion of the channel adjacent to the piston member 33$^a$ is entirely sealed from contact with the fluid contained in the channel on the opposite side of the channel plate. In this portion is the enlargement 40$^a$ with the threaded hole 34$^a$ receiving screw plug 36$^a$ arranged for adjustment of resistance to rebound of the vehicle spring in conjunction with one-way valve 47$^a$ mounted in recesses in the channel walls. One section, 67, of this portion of the channel is arranged to be placed in such a direction in the mounted device that the free piston 68 gravitates toward the ledge 69 formed upon the channel wall and comes to rest against it unless subjected to impulsions in the opposite direction through movements of the fluid. To this end the said piston 68 fits loosely in the channel and is also provided with a small aperture, as indicated in dotted lines in Fig. 13 and explained more fully in my United States Patent, No. 1,258,021 granted March 5, 1918. A projection 70 on the wall of the channel limits the upward range of piston 68. The threaded hole 71 receives a screw plug 92 which may be selected of such length that, when screwed up, it forms an obstruction in the channel by which the flow of oil may be impeded in both directions of movement. By this provision, which could also be readily incorporated in the form of my invention here first described, all deflections of the vehicle spring may be damped and retarded, as may be desirable where vehicle springs are too weak for their loads and unfit for sustaining the flexions to which severe shocks would subject them.

Cover plate 72 with a circular aperture fitting around the hub of piston member 33$^a$ is secured by screws 73 and 74 (the latter not shown) for which threaded holes 75 and 76 are provided, and by the holding bolts 77 and 78 in holes 79 and 80, which also serve to hold down the plate 56$^a$ by means of which the operating lever 54ª is held upon the hexagon boss 55ª of the piston member. Hole 81 receives a third holding bolt 82. The link 59ª, shown with a portion broken away, connects the operating lever with the vehicle spring and with the axle 64ª by means of lug 62ª or in any other manner suitable for the purpose of turning piston member 33ª when the axle is moved in relation to vehicle frame 65ª.

In this form of my invention the use of an extension-spring acting as the link 59ª is unnecessary, as the preferred manner of utilizing the device is to adjust screw plug 34ª to check rebound, in conjunction with one-way valve 47ª, somewhat less than would be in itself desirable if no other means for checking it were used, and to obtain an additional check of the rebound by means of the free piston 68, which always begins to operate as a check on the rebound, at the moment when the vehicle spring and axle, after their first movement due to a road shock, have reached back to the position from which they started at the beginning of the shock, this feature being fully explained in my patent hereinbefore referred to.

What I claim is:

1. A rebound check comprising a casing having a continuous passage therein, movable means for dividing the casing into portions, a positively actuated piston in one portion, a check valve in another portion, a plastic substance in the portion of the passage in which said positively actuated member is disposed, and a relatively viscous medium in the portion of the passage in which the check valve is disposed.

2. A rebound check comprising a casing having a continuous passage therein, movable means for dividing the casing into portions, a positively actuated piston in one portion, a check valve in another portion of said passage adapted to partially close the passage when closed, adjustable means for regulating the opening in the passage independently of the check valve, one portion of said passage having a relatively stiff plastic substance contained therein and the other portion having a relatively viscous liquid.

3. A rebound check comprising a casing having a continuous passage formed therein, a check valve in the passage, a lever positively connected to the casing, a positively actuated piston in the passage connected to the lever, and an extension spring which constitutes a rigid link when compressed, connected to the lever.

4. A rebound check for resiliently connected members comprising a casing secured to one of said members and having an endless fluid passage, a piston in the passage, a lever affixed to the piston, an extension spring interposed between the other of said resiliently connected members and the lever, said extension spring being arranged to constitute a non-compressible link.

5. A rebound check for resiliently connected members comprising a casing affixed to one of said members, having an endless fluid passage, movable members for dividing the passage into portions, a piston in one portion of the passage adapted to be positively actuated by the relative movements of the resiliently connected members, a check valve for partially closing the other portion of the passage, a plastic substance in the portion of the passage in which the piston is contained, and a relatively viscous liquid in the other portion of the passage.

6. A rebound check for resiliently connected members comprising a casing affixed to one of said members having an endless fluid passage, movable members for dividing the passage into portions, a piston in one portion of the passage adapted to be positively actuated by the relative movements of the resiliently connected members, a check valve for frequently closing the other portion of the passage, a plastic substance in the portion of the passage in which the piston is contained, a relatively viscous liquid in the other portion of the passage, and adjustable means for regulating the opening in the passage when the check is closed.

7. A rebound check for a pair of resiliently connected bodies, comprising a fluid containing casing connected to one of the bodies and having an endless fluid passage, a member in the passage connected to be actuated by the other body, a detached member also in said passage movable in both directions with the aforesaid member, means for arresting the movement of the detached movable member in one direction, and a check valve for partially closing the passage when the fluid is traveling therein in one direction.

8. A rebound check for a pair of resiliently connected bodies, comprising a fluid containing casing connected to one of the bodies and having an endless fluid passage, a member in the passage connected to be actuated by the other body, a detached member also in said passage movable in both directions with the aforesaid member, means for arresting the movement of the detached movable member in one direction, movable members for dividing the passage into sections with the actuated member in one section, and the freely movable member in the other.

9. A rebound check for a pair of resiliently connected bodies, comprising a fluid containing casing connected to one of the bodies and having an endless fluid passage, a member in the passage connected to be actuated by the other body, a detached member also in said passage movable in both directions with the aforesaid member, means for arresting the movement of the detached movable member in one direction, movable members for dividing the passage into sections with the actuated member in one section and the freely movable member in the other, a plastic substance being disposed in the section of the passage in which the actuated piston is located.

In witness whereof I have signed my name to this specification on this 23d day of January, 1917.

MARIUS C. KRARUP.